US008420933B2

(12) United States Patent
Harada et al.

(10) Patent No.: US 8,420,933 B2
(45) Date of Patent: Apr. 16, 2013

(54) HIGH-PRESSURE-RESISTANT HERMETIC SEAL TERMINAL AND METHOD OF MANUFACTURING THE SAME

(75) Inventors: Hidehiko Harada, Koka (JP); Norifumi Kitamura, Koka (JP); Hiroyuki Kojima, Koka (JP)

(73) Assignee: NEC Schott Components Corporation, Koka-shi (JP)

( * ) Notice: Subject to any disclaimer, the term of this patent is extended or adjusted under 35 U.S.C. 154(b) by 61 days.

(21) Appl. No.: 13/259,435

(22) PCT Filed: Apr. 6, 2010

(86) PCT No.: PCT/JP2010/056256
§ 371 (c)(1),
(2), (4) Date: Sep. 23, 2011

(87) PCT Pub. No.: WO2010/117000
PCT Pub. Date: Oct. 14, 2010

(65) Prior Publication Data

US 2012/0018216 A1 Jan. 26, 2012

(30) Foreign Application Priority Data

Apr. 8, 2009 (JP) ................................ 2009-093850

(51) Int. Cl.
*H02G 3/18* (2006.01)

(52) U.S. Cl.
USPC .................. 174/50.6; 174/151; 174/152 GM; 439/935; 361/302

(58) Field of Classification Search ................. 174/50.6, 174/50.56, 50.61, 152 GM, 151; 439/935, 439/926; 361/302, 303
See application file for complete search history.

(56) References Cited

U.S. PATENT DOCUMENTS 4,047,292 A * 9/1977 Shaffer .......................... 29/878
6,107,566 A * 8/2000 Quadir et al. ............. 174/50.52
7,145,076 B2 * 12/2006 Knappen et al. ............ 174/50.6

FOREIGN PATENT DOCUMENTS

| | | |
|---|---|---|
| JP | 57-110873 | 7/1982 |
| JP | 59-141179 | 8/1984 |
| JP | 04-054153 | 5/1992 |
| JP | 07-245154 | 9/1995 |
| JP | 2008-258100 | 10/2008 |

OTHER PUBLICATIONS

PCT International Search Report of the International Searching Authority for International Application PCT/JP2010/056256, mailed May 18, 2010, 2 pages, Japanese Patent Office.

English Translation of PCT Written Opinion of the International Searching Authority for International Application PCT/JP2010/056256, mailed May 18, 2010, 4 pages, Japanese Patent Office.

* cited by examiner

*Primary Examiner* — Dhirubhai R Patel
(74) *Attorney, Agent, or Firm* — W. F. Fasse

(57) ABSTRACT

A high-pressure-resistant hermetic seal terminal includes an eyelet which has a through hole and a lead which is electrically insulated and hermetically sealed via a glass material in the through hole. The glass material is welded in a manner to extend on a lower surface of the eyelet from an end of the through hole to surroundings of the end of the through hole. Preferably, the eyelet has a counterbore, in the lower surface, extending in a region around and surrounding the through hole, and the glass material is welded to the inside of the counterbore.

7 Claims, 5 Drawing Sheets

HIGH-PRESSURE-RESISTANT HERMETIC SEAL TERMINAL AND METHOD OF MANUFACTURING THE SAME

TECHNICAL FIELD

The present invention relates to a high-pressure-resistant hermetic seal terminal, and more specifically to a hermetic seal terminal preferable for use as a feedthrough terminal in a compressor having an internal pressure of not less than 10 MPa, such as a refrigerator, air conditioner and a water heater.

BACKGROUND ART

A hermetic seal terminal is formed by hermetically sealing a lead via glass in an insertion hole of an eyelet or metal outer ring and used in supplying current to an electrical device or an electrical element enclosed in a hermetic seal package and in leading a signal out of the electrical device or the electrical element. For example, as disclosed in Japanese Patent Laying-Open No. 2008-258100 (Patent Literature 1), a hermetic seal terminal for a compressor such as a refrigerator and an air conditioner is provided with a metal outer ring which includes a top plate portion, a cylindrical portion extending downward from the outer circumferential edge of the top plate portion, a flange portion flaring obliquely outward from the lower end of the cylindrical portion, and three small cylindrical portions which form lead sealing holes extending inward from the top plate portion. Further, a lead is hermetically sealed via sealing glass in each of the lead sealing holes of the metal outer ring.

For instance, in recent years, with the aims of preventing global warming and reducing environmental burdens, there are growing moves to switch from refrigerants such as HFC134a, which are based on replacement compounds for chlorofluorocarbons and conventionally used in compressors, to natural refrigerants such as carbon dioxide, which place less burden on the environment. Although carbon has always occurred in nature and has a minor impact on global warming, its application to compressors such as an air conditioner causes an approximately ten times higher internal pressure than application of HFC134a causes. Accordingly, the requirements for mechanical strength of hermetic seal terminals used for environment-friendly compressors are getting stricter. As such, there have been an increasing number of cases recently where hermetic seal terminals are required to be used in a harsher usage environment than expected. In a case of a compressor using the natural refrigerant described in the example above, the internal pressure reaches 10 MPa or higher. Conventionally, a hermetic seal terminal required to resists such high pressure needs special measures such as a structure using a special metal material for a metal outer ring and a lead, as disclosed in Japanese Patent Laying-Open No. 59-141179 (Patent Literature 2).

CITATION LIST

Patent Literature

PTL 1: Japanese Patent Laying-Open No. 2008-258100
PTL 2: Japanese Patent Laying-Open No. 59-141179

SUMMARY OF INVENTION

Technical Problem

A high-pressure resistant hermetic seal terminal for the compressor as described above needs to have a balance of toughness and elongation to have a suitable mechanical strength, and therefore, for example, low-carbon steel or stainless steel is used for an eyelet, and an iron-chromium alloy material is used for a lead. This makes matching with sealing glass, which has a different coefficient of thermal expansion, difficult, and a crack tends to occur because of the difference between coefficients of material expansion. Cracking introduces moisture from the outside and leads to damage to insulation between the eyelet and the lead. In particular, the inventors have found that such cracking tends to occur in a region of an inner end of a through hole in the eyelet, and studied effective measures for preventing cracking in this region. Now, the inventors propose a hermetic seal terminal which provides satisfactory electrical insulation between an eyelet and a lead over a long period of time.

Therefore, the present invention proposes a solution to the drawbacks above in light thereof, and an object of the present invention is to provide a new and improved hermetic seal terminal which maintains stable electrical insulation between an eyelet and a lead, and to present a method of manufacturing the same.

Solution to Problem

The present invention provides a high-pressure-resistant hermetic seal terminal which includes an eyelet having a through hole and a lead electrically insulated and hermetically sealed via glass material in the through hole. The glass material is welded in a manner to extend on a lower surface of the eyelet from an end of the through hole to surroundings of the end of the through hole. Preferably, the eyelet has a counterbore, in the lower surface, extending in a region around and surrounding the through hole, and the glass material is welded to an inside of the counterbore.

Preferably, in the invention above, the glass material welded to the inside of the counterbore has a thickness of 0.4 mm to 2 mm. Further, preferably, the counterbore has a depth of not less than 0.4 mm and has an inner diameter not less than 1.2 times an inner diameter of the through hole. Further, preferably, the glass material welded to the inside of the counterbore has a flat-formed surface.

The present invention also provides a method of manufacturing a high-pressure-resistant hermetic seal terminal having a glass material extending in a portion surrounding a through hole. The method includes a clearance forming step of providing, opposite to a sealing jig, an eyelet which has a through hole and a counterbore formed in a lower surface and extending in a region around and surrounding the through hole to form a clearance between the counterbore and the sealing and a filling step of filling the through hole and the clearance with a molten glass material with a lead inserted through the through hole.

Preferably, in the filling step, the clearance is filled with the glass material using capillary action. Further, preferably, the sealing jig has a flat surface opposite to the eyelet. Preferably, in the filling step, a contact surface of the glass material with the sealing jig is molded flat.

Advantageous Effects of Invention

The present invention can increase a creepage distance between an eyelet and a lead and can provide a high-pressure-resistant hermetic seal terminal.

DESCRIPTION OF EMBODIMENTS

A high-pressure-resistant hermetic seal terminal of the present invention includes an eyelet which has a through hole and a lead which is electrically insulated and hermetically sealed via a sealing glass material in the through hole. The eyelet is plate-shaped and the through hole extends through from an upper surface to a lower surface. The shape of the upper surface and the lower surface of the plate-shaped eyelet can be, for example without limitation, configured in a circle. For the eyelet, an eyelet having a through hole and in any shape can be formed, for example, by cutting any one of carbon steel materials S10C to S45C. While the material of the lead is not limited, preferably, a lead made of an iron-chromium alloy, which has an excellent sealing property with glass, is used. The sealing glass material is extended to a portion surrounding an end of the through hole on a lower surface side of the eyelet. Preferably, a counterbore is formed in the lower surface of the eyelet, in a region around the through hole and extending to a portion surrounding the through hole. The above-described extension portion of the sealing glass material spreads into the counterbore, and the counterbore restricts the region where the sealing glass material spreads out. That is, the flow of the molten glass material into the counterbore can form the extension portion of the sealing glass material. The extension portion of the sealing glass material is capable of preventing a crack in the sealing glass material which occurs in a region on the end of the through hole of the eyelet. An embodiment of the high-pressure-resistant hermetic seal terminal of the present invention will be hereinafter described with reference to the drawings.

Figure 1:
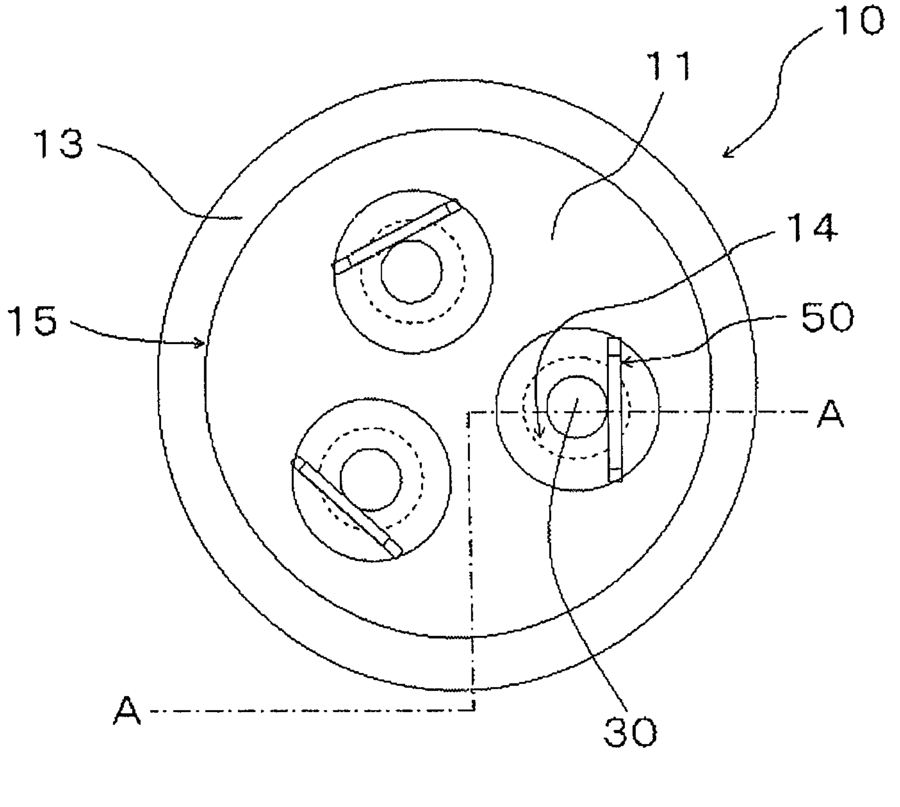
FIG. 1 is a top view of a hermetic seal terminal of an embodiment according to the present invention.
Figure 2:
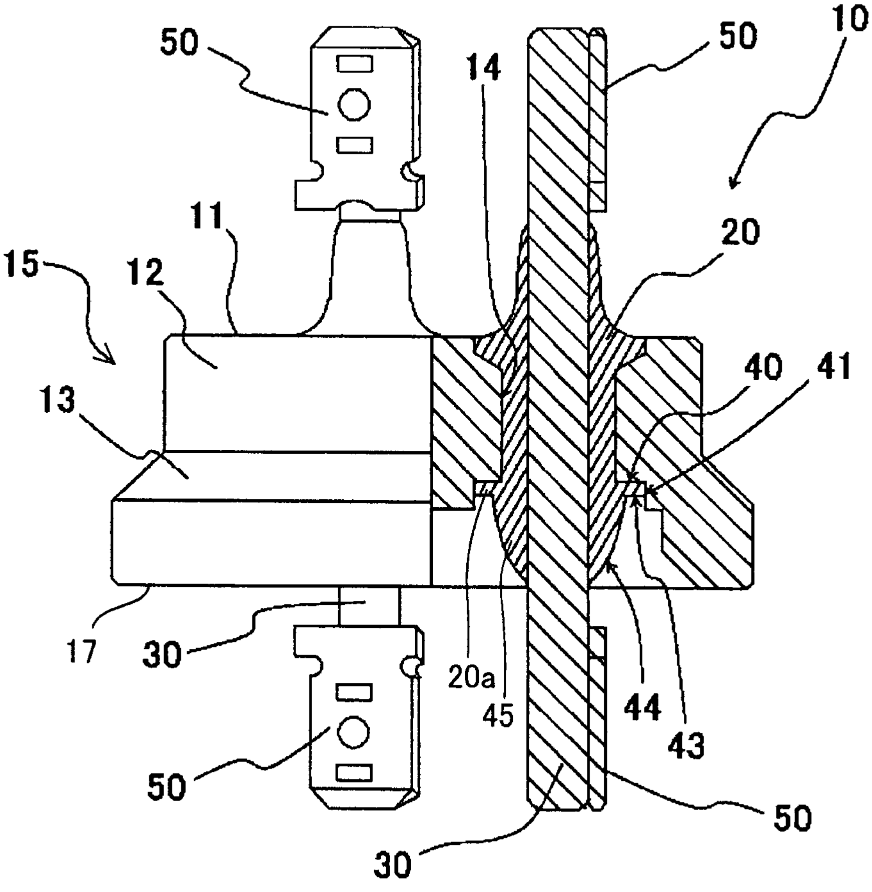
FIG. 2 is a vertical cross sectional view of the hermetic seal terminal along a line A-A in FIG. 1.
Figure 3:
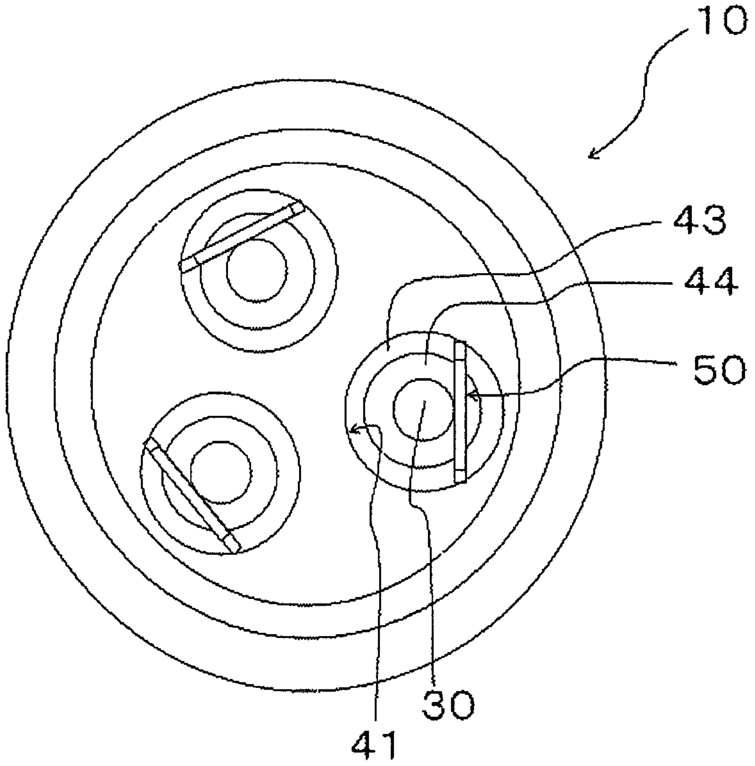
FIG. 3 is a bottom view of the hermetic seal terminal in FIG. 1.

FIGS. 1 to 3 show a hermetic seal terminal 10 which is an embodiment according to the present invention. FIG. 1 is a top view of hermetic seal terminal 10. FIG. 2 is a vertical cross sectional view along a line A-A in FIG. 1. FIG. 3 is a bottom view of hermetic seal terminal 10. As shown in FIGS. 1 to 3, hermetic seal terminal 10 includes an eyelet 15 in which a circular plate portion 12 with a circular cross section and a flange portion 13 with a circular cross section and flaring obliquely outward from the outer circumference of circular plate portion 12 are integrally formed by cutting medium-carbon steel S30C. Eyelet 15 further has three through holes 14 with circular cross sections. Hermetic seal terminal 10 further includes a lead 30 which is made of an iron-chromium alloy and hermetically sealed in each of through holes 14 of eyelet 15 via a sealing glass material 20 which is implemented as soda glass. Each through hole 14 extends through from an upper surface 11 to a lower surface 17 of eyelet 15. Lead 30 has opposing ends connected to respective terminal plates 50.

A circular counterbore 40 is formed in lower surface 17 of eyelet 15 in a manner to extend in a region around and surrounding each through hole 14. The sealing glass material is also welded to this portion. The glass material welded to the inside of counterbore 40 is herein referred to as an extension portion 20*a* of the glass material. Counterbore 40 can be formed to have a counterbore shape of, for example, a diameter of 9 mm and a depth of 1.5 mm. The sealing glass material welded to the inside of counterbore 40 and forming extension portion 20*a* suppresses occurrence of a crack open to the atmosphere and connecting the eyelet and the lead to each other, and prevention of insulation degradation can be achieved. Its principle will be described later using FIG. 4. Preferably, the glass material of extension portion 20*a* has a thickness of 0.4 mm to 2 mm.

Now, given that counterbore 40 has a diameter D and through hole 14 has a bore diameter d, diameter D of the counterbore is defined by its ratio to bore diameter d of the through hole D/d. Preferably, D/d is in a range of 1.2 to 2. More preferably, D/d is in a range of 1.4 to 1.8. If D/d has a value less than 1.2, a sufficient creepage distance between eyelet 15 and lead 30 cannot be obtained. On the other hand, if the value of D/d exceeds two, it is difficult to cause the sealing glass material to extend and project from through hole 14 of eyelet 15 into a cut portion of the counterbore by spreading the sealing glass material into a disk-like shape through wetting. In the present embodiment, for example, through hole can have a bore diameter d=6 mm, and counterbore 40 can have a diameter D=9 mm, where D/d is 1.5.

Glass material 20 is also welded further below beyond counterbore 40 along an axial line of lead 30. Below counterbore 40, glass material 20 is welded, for example, in a tapered manner getting gradually narrower as shown in FIG. 2. The tapered portion of the glass material is hereinafter referred to as a glass fillet portion 45, and the slanting surface of glass fillet portion 45 is hereinafter referred to as a glass fillet slanting surface 44. The shape of glass fillet portion 45 can be regulated by the shape of a jig used in a manufacturing process. In addition to glass fillet portion 45 formed on the axial line of the lead, extension portion 20*a* formed in counterbore 40 increases the creepage distance between eyelet 15 and lead 30, which has an effect of preventing insulation degradation and electrical shorting caused by adhesion of metal fine powder such as swarf generated from a drive system inside a compressor.

Figure 4:
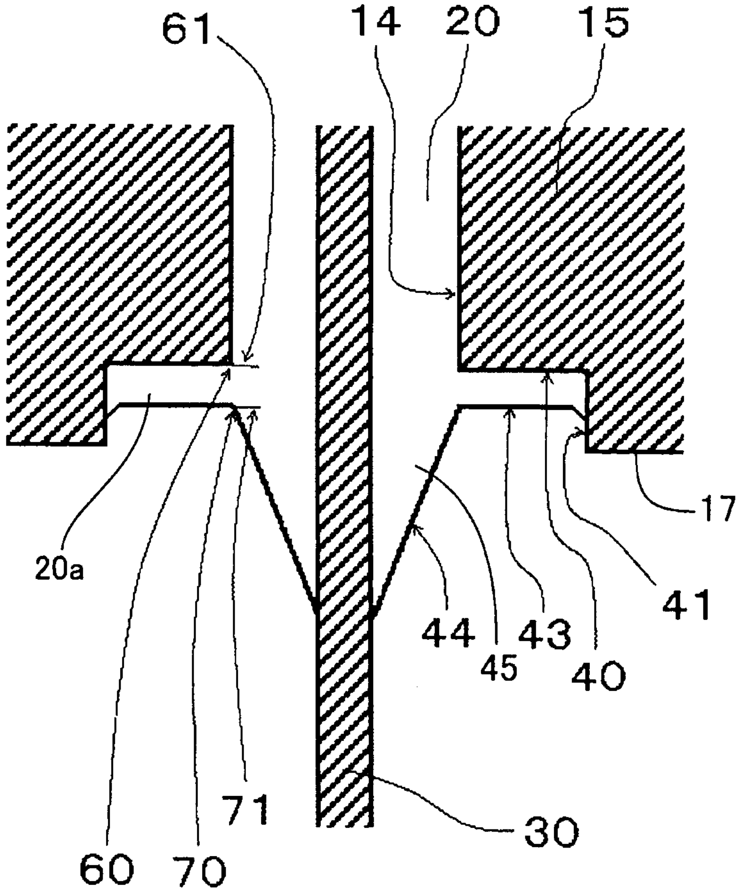
FIG. 4 is an enlarged vertical cross sectional view of a through hole portion of the hermetic seal terminal in FIG. 1.

FIG. 4 is an enlarged vertical cross sectional view of a through hole portion of hermetic seal terminal 10. As shown in FIG. 4, in above-described hermetic seal terminal 10, counterbore 40 provided in an extent which is on a lower surface 17 side of eyelet 15 and which reaches a region surrounding through hole 14 is filled with sealing glass material 20 keeping a uniform thickness to an end face 41 of counterbore 40, so that extension portion 20*a* is formed. As described above, it is preferable for extension portion 20*a* to have a thickness of 0.4 mm to 2 mm. Thus, in order to weld the glass material in a disk-like shape with such a thickness, it is preferable to provide a clearance of a desired thickness with respect to a jig and use capillary action to spread molten glass through wetting. In this case, extension portion 20*a* has a surface 43 formed as a flat surface which serves as a contact surface with the jig and is a non-free surface.

Extension portion 20*a* of the glass material welded to counterbore 40 distributes compressive stress, which is generated due to difference between thermal expansions of eyelet 15 and glass material 20, over bent portions 60, 70 of glass material 20. Bent portion 60 of glass material 20 is formed on an end of through hole 14, while bent portion 70 is formed at an intersection of glass flat surface 43 and glass fillet slanting surface 44. Although cracks from bent portions 60, 70 extend, for example, in parallel directions 61, 71, respectively, neither connects eyelet 15 and lead 30 to each other. Hence, the cracks are less apt to cause insulation degradation even if moisture or the like intrudes. It is noted that as to crack 61, since it is enclosed in glass material 20 and not open, it is difficult for moisture or the like to intrude in the crack in the first place, and suppression of insulation breakdown can be achieved. Further, distributing compression stress over bent portions 60, 70 enables relaxing stress concentration, and a large crack is less apt to occur. If a crack connecting eyelet 15 and lead 30 to each other occurs, for example, in alkali cleaning serving as a pretreatment process in mounting the hermetic seal terminal on a device, intrusion of an ionic substance into the crack causes insulation breakdown between the eyelet and the lead. In the hermetic seal terminal of the present embodiment, however, such a crack is less apt to occur as described above, and prevention of insulation breakdown can be achieved.

Figure 6:
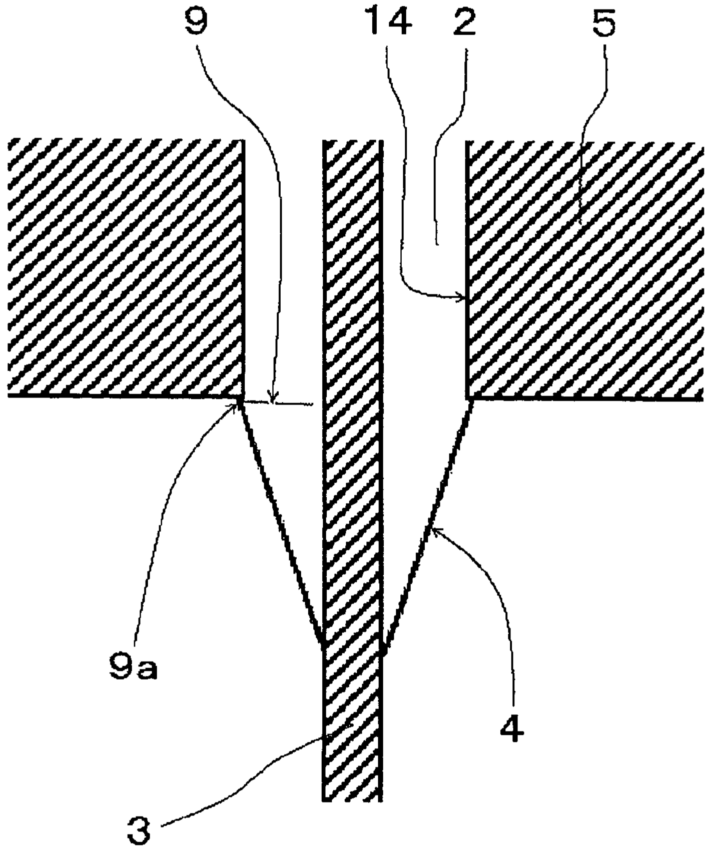
FIG.6 PRIOR ART
FIG. 6 is an enlarged vertical cross sectional view of a through hole portion of a hermetic seal terminal in a conventional example.

FIG. 6 is an enlarged vertical cross section of a through hole portion of a hermetic seal terminal in a conventional example. In the hermetic seal terminal shown in FIG. 6, a lead 3 is hermetically sealed via a sealing glass material 2 in a through hole 14 formed in an eyelet 5. Through hole 14 is filled with glass material 2. Further, beyond an end 9*a* of the through hole, glass material 2 is formed into a tapered shape getting gradually narrower, and the slanting surface of the tapered portion constitutes a glass fillet slanting surface 4. In the hermetic seal terminal shown in FIG. 6, end 9*a* of through hole 14 serves as a bent point and a start point of a crack 9. Crack 9 occurred starting from this point connects eyelet 5 and lead 3 to each other, and thus causes insulation breakdown. Furthermore, because compressive stress concentrates on end 9*a*, crack 9 of large size tends to occur.

As above, the hermetic seal terminal of the present invention is capable of distributing stress, which is concentrated on the end of the through hole in the hermetic seal terminal shown in FIG. 6, over the glass bent portions formed at a corner portion of a lower end of the through hole and the lower surface side of the eyelet, respectively, and capable of achieving prevention of occurrence of a crack which connects the eyelet and the lead to each other and prevention of insulation degradation. Furthermore, since concentration of stress at one point can be relaxed, a large crack is less apt to occur.

Figure 5:
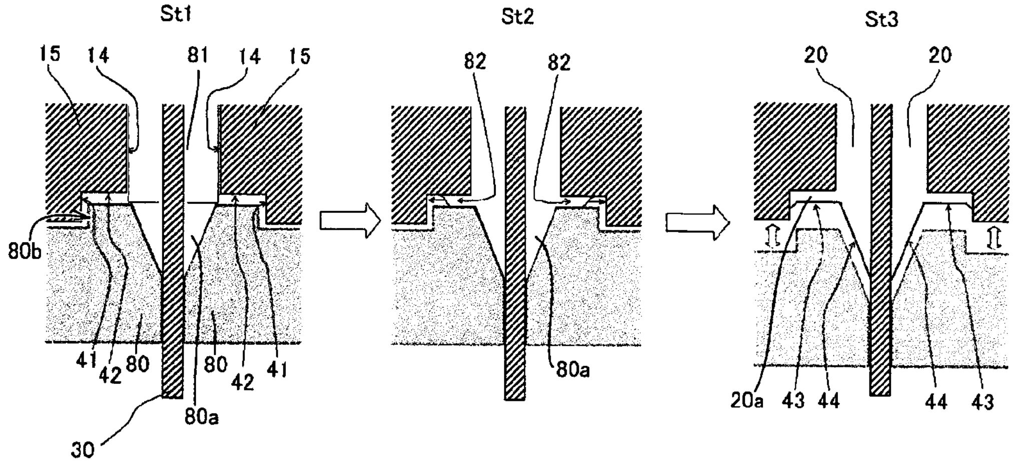
FIG. 5 is a main portion cross sectional view illustrating states of a sealing process of the hermetic seal terminal in FIG. 1.

FIG. 5 shows a filling method with a sealing glass material in the hermetic seal terminal according to the present embodiment. The filling method uses a sealing jig 80 having a convex portion 80*b* which can be fitted and inserted into counterbore 40. Sealing jig 80 has a through hole at the center of convex portion 80*b* for insertion of lead 30, and a through hole opening 80*a* has a tapered shape widening toward an open end. First, as shown in St 1, eyelet 15 is placed on sealing jig 80 such that counterbore 40 of eyelet 15 and convex portion 80*b* of sealing jig 80 are opposite to each other, and a clearance is formed between counterbore 40 and convex portion 80*b* of sealing jig 80 (clearance forming step). Lead 30 is then inserted through through hole 14 of eyelet 15 and the through hole of sealing jig 80. A glass tablet 81 is pre-sintered and formed to surround lead 30 in advance. It is noted that cylindrical glass tablet 81 may be placed in through hole 14 of eyelet 15 in advance, followed by insertion of lead 30 through glass tablet 81 and through hole 14 of eyelet 15.

Next, as shown in St2, together with sealing jig 80, heating is performed in a heating furnace to melt glass tablet 81 so that lead 30 is sealed via sealing glass material 20 in through hole 14 of eyelet 15. Concurrently, the clearance formed between a counterbore bottom face 42 and sealing jig 80 serves as a capillary, and capillary action causes a molten glass material 82 to creep over and spread out through wetting and causes molten glass material 82 to reach to counterbore end face 41, so that glass material 82 fills the counterbore seamlessly to form extension portion 20*a*. Furthermore, molten glass material extends and fills through hole opening 80*a* of sealing jig 80 as well (filling step). In hermetic seal terminal 10 of the present embodiment, for example, by providing a 0.8 mm clearance between counterbore bottom face 42 and convex portion 80*a* of sealing jig 80, extension portion 20*a* of the glass material with a thickness of 0.8 mm and in parallel with counterbore bottom face 42 is formed in a disk-like shape and in a direction orthogonal to through hole 14.

At this time, extension portion 20*a* of the glass material which has advanced along the clearance serving as a capillary and has formed in a disk-like shape is allowed to adhere while its contact surface with sealing jig 80 is being molded flat. The contact surface herein refers to a surface of the glass material which is a non-free surface. The hermetic seal terminal is slowly cooled from the temperature of the furnace while being kept in contact with sealing jig 80. After adhesion of glass material 82 to counterbore bottom face 42 of eyelet 15, sealing jig 80 is removed from hermetic seal terminal 10 as shown in St3, and the hermetic seal terminal is completed.

The hermetic seal terminal of the present invention is capable of extending the creepage distance between the eyelet and the lead to a desired extent by regulating the diameter of the counterbore portion. Further, the eyelet of the hermetic seal terminal of the present invention requires no mold change and thus allows for design change at lower cost and in shorter lead time as compared to a pressed product. This allows for quick adaptation corresponding to a model change and the like of a device on which the hermetic seal terminal is mounted, and significant reduction of lead time can be realized. Furthermore, there is no need to use a conventionally used part such as an insulation sleeve. Thus, manufacturing can be achieved without changing conventional material constitution, and therefore, easier assembling is achieved at no extra material cost.

Still further, as compared to a conventional method in which a bulky insulation sleeve or the like is attached to an inner terminal portion, a reduced volume of parts arranged on the axial line of the lead is achieved, and an advantage of readily adapting to downsizing of the hermetic seal terminal is provided.

The hermetic seal terminal of the present invention is formed by electrically insulating and hermetically sealing the lead via the sealing glass material in the through hole of the eyelet and by causing the sealing glass material to extend from an end of the through hole on an eyelet lower surface side to the surroundings of the end of the through hole, and prevents occurrence of a crack connecting the eyelet and the lead to each other. Further, the glass material which projects into the counterbore formed along the end of the through hole on the eyelet lower surface side and the glass fillet slanting surface which is continuous with the projecting glass material and formed on the axial line of the lead eyelet increase the creepage distance between the eyelet and the lead to increase the insulation distance therebetween, and prevention of insulation degradation and shorting caused by adhesion of metal fine powder between the eyelet and the lead can be achieved. Furthermore, compressive stress applied to one site of an end region of the through hole of the eyelet is reduced and occurrence of a large crack is prevented. For the reasons above, prevention of insulation degradation can be achieved. Moreover, there is no need for conventional insulation measures using an insulation sleeve or the like, and insulation can be realized by insulation glass alone. An excellent function and effect of reducing manufacturing cost is therefore provided.

Next, hermetic seal terminal 10 of the embodiment above and a conventional hermetic seal terminal serving as a comparative example are simultaneously subjected to a moisture resistant insulation property test, and the result is shown in Table 1. The comparative example is a hermetic seal terminal having a through hole whose structure in the vicinity of the lower surface is as the structure shown in FIG. 6. Below the through hole, only a tapered glass fillet having glass fillet slanting surface 4 is formed.

The moisture resistant insulation property test was carried out under the following test conditions. Twenty-eight samples were taken from each of the hermetic seal terminal of the embodiment and the hermetic seal terminal of the comparative example. The initial insulation resistance was measured as a value after a 1-min application of DC 500 V. Subsequently, samples were immersed, stirred and cleaned in a 2% alkaline cleaning fluid at 60° C., dried naturally at ordinary temperature, and then kept for 24 hours in a constant temperature and humidity chamber regulated at 65° C./97% RH, followed by measurement of the insulation resistance immediately after removal from the chamber, as a value after a 1 min application of a DC 500V.

TABLE 1

Comparison Table Between Hermetic Seal Terminals of Present Invention and Conventional Hermetic Seal Terminals Under Moisture Resistant Insulation Property Test

[UNIT: MΩ]

| | EMBODIMENT | | COMPARATIVE EX. | |
|---|---|---|---|---|
| | INITIAL | AFTER SUBJECTED TO MOISTURE | INITIAL | AFTER SUBJECTED TO MOISTURE |
| 1 | $>1 \times 10^6$ | $>1 \times 10^6$ | $1 \times 10^5$ | $1 \times 10^3$ |
| 2 | $>1 \times 10^6$ | $>1 \times 10^6$ | $>1 \times 10^6$ | $>1 \times 10^6$ |
| 3 | $>1 \times 10^6$ | $>1 \times 10^6$ | $>1 \times 10^6$ | $>1 \times 10^6$ |
| 4 | $>1 \times 10^6$ | $>1 \times 10^6$ | $>1 \times 10^6$ | $>1 \times 10^6$ |
| 5 | $>1 \times 10^6$ | $>1 \times 10^6$ | $>1 \times 10^6$ | $1 \times 10^4$ |
| 6 | $>1 \times 10^6$ | $>1 \times 10^6$ | $1 \times 10^5$ | $1 \times 10^2$ |
| 7 | $>1 \times 10^6$ | $>1 \times 10^6$ | $>1 \times 10^6$ | $1 \times 10^3$ |
| 8 | $>1 \times 10^6$ | $>1 \times 10^6$ | $>1 \times 10^6$ | $1 \times 10^5$ |
| 9 | $>1 \times 10^6$ | $>1 \times 10^6$ | $>1 \times 10^6$ | $1 \times 10^5$ |
| 10 | $>1 \times 10^6$ | $>1 \times 10^6$ | $>1 \times 10^6$ | $1 \times 10^4$ |
| 11 | $>1 \times 10^6$ | $>1 \times 10^6$ | $>1 \times 10^6$ | $>1 \times 10^6$ |
| 12 | $>1 \times 10^6$ | $>1 \times 10^6$ | $>1 \times 10^6$ | $>1 \times 10^6$ |
| 13 | $>1 \times 10^6$ | $>1 \times 10^6$ | $>1 \times 10^6$ | $1 \times 10^3$ |
| 14 | $>1 \times 10^6$ | $>1 \times 10^6$ | $1 \times 10^5$ | $1 \times 10^2$ |
| 15 | $>1 \times 10^6$ | $>1 \times 10^6$ | $>1 \times 10^6$ | $>1 \times 10^6$ |
| 16 | $>1 \times 10^6$ | $>1 \times 10^6$ | $1 \times 10^4$ | $1 \times 10^3$ |
| 17 | $>1 \times 10^6$ | $>1 \times 10^6$ | $1 \times 10^5$ | $1 \times 10^3$ |
| 18 | $>1 \times 10^6$ | $>1 \times 10^6$ | $>1 \times 10^6$ | $1 \times 10^3$ |
| 19 | $>1 \times 10^6$ | $>1 \times 10^6$ | $>1 \times 10^6$ | $1 \times 10^5$ |
| 20 | $>1 \times 10^6$ | $>1 \times 10^6$ | $>1 \times 10^6$ | $1 \times 10^5$ |
| 21 | $>1 \times 10^6$ | $>1 \times 10^6$ | $>1 \times 10^6$ | $>1 \times 10^6$ |
| 22 | $>1 \times 10^6$ | $>1 \times 10^6$ | $>1 \times 10^6$ | $>1 \times 10^6$ |
| 23 | $>1 \times 10^6$ | $>1 \times 10^6$ | $>1 \times 10^6$ | $1 \times 10^3$ |
| 24 | $>1 \times 10^6$ | $>1 \times 10^6$ | $>1 \times 10^6$ | $>1 \times 10^6$ |
| 25 | $>1 \times 10^6$ | $>1 \times 10^6$ | $>1 \times 10^6$ | $1 \times 10^5$ |
| 26 | $>1 \times 10^6$ | $>1 \times 10^6$ | $1 \times 10^4$ | $1 \times 10^4$ |
| 27 | $>1 \times 10^6$ | $>1 \times 10^6$ | $>1 \times 10^6$ | $1 \times 10^2$ |
| 28 | $>1 \times 10^6$ | $>1 \times 10^6$ | $>1 \times 10^6$ | $1 \times 10^4$ |
| max. | $>1 \times 10^6$ | $>1 \times 10^6$ | $>1 \times 10^6$ | $>1 \times 10^6$ |
| avg. | $>1 \times 10^6$ | $>1 \times 10^6$ | $8 \times 10^5$ | $3 \times 10^5$ |
| min. | $>1 \times 10^6$ | $>1 \times 10^6$ | $1 \times 10^4$ | $1 \times 10^2$ |

The samples of the present invention did not vary in insulation resistance values before and after the test and exhibited good test results. On the other hand, the samples of the comparative example varied widely even in the initial insulation resistance values and showed decreases of the insulation resistance values after the moisture resistant insulation property test.

INDUSTRIAL APPLICABILITY

The present invention can be used in particular as a hermetic seal terminal which is required to have high withstanding pressure and high dielectric strength.

REFERENCE SIGNS LIST

10 hermetic seal terminal, 11 upper surface, 12 circular plate portion, 13 flange portion, 14 through hole, 15 eyelet, 17 lower surface, 20 sealing glass material, 20*a* extension portion, 30 lead, 40 counterbore, 41 counterbore end face, 42 counterbore bottom face, 43 glass flat surface, 44 glass fillet slanting surface, 45 glass fillet portion, 50 terminal plate, 60 corner of lower surface through hole, 70 glass bent portion, 80 sealing jig, 82 molten glass material.

The invention claimed is:

1. A high-pressure-resistant hermetic seal terminal, comprising:

an eyelet having a through hole and having a counterbore around said through hole in a lower surface of said eyelet; and a lead electrically insulated and hermetically sealed via a glass material in said through hole, said glass material including: a portion filling said through hole; an extension portion extending in and welded to an inside of said counterbore; and a glass fillet portion formed below said extension portion, along said lead and in a tapered shape getting gradually narrower, and said glass fillet portion having a diameter smaller than a diameter of said extension portion.

2. The high-pressure-resistant hermetic seal terminal according to claim 1, wherein said glass material welded to the inside of said counterbore has a thickness of 0.4 millimeter to 2 millimeters.

3. The high-pressure-resistant hermetic seal terminal according to claim 1, wherein said counterbore has a depth of not less than 0.4 millimeter and has an inner diameter not less than 1.2 times an inner diameter of said through hole.

4. The high-pressure-resistant hermetic seal terminal according to claim 1, wherein said glass material welded to the inside of said counterbore has a flat surface.

5. A method of manufacturing a high-pressure-resistant hermetic seal terminal, comprising:

a clearance forming step of providing, opposite to a sealing jig, an eyelet having a through hole and a counterbore formed in a lower surface and extending in a region around and surrounding said through hole to form a clearance between said counterbore and said sealing jig, wherein said sealing jig has a tapered depression in a through hole opening; and a filling step of filling said through hole, said clearance in said counterbore and said tapered depression with a molten glass material to form an extension portion of said glass material in said counterbore and to form a tapered fillet portion of said glass material in said tapered depression, and with a lead inserted through said through hole and through said through hole opening.

6. The method of manufacturing a high-pressure-resistant hermetic seal terminal according to claim 5, wherein, in said filling step, said clearance is filled with said glass material using capillary action.

7. The method of manufacturing a high-pressure-resistant hermetic seal terminal according to claim 5, wherein said sealing jig has a flat surface opposite to said eyelet, and in said filling step, a contact surface of said glass material with said sealing jig is molded flat.

* * * * *